(12) United States Patent
Whittaker et al.

(10) Patent No.: US 7,754,086 B2
(45) Date of Patent: *Jul. 13, 2010

(54) DEWATERING PROCESS

(75) Inventors: Tony Whittaker, Bradford (GB); Peter Norman, Liversedge (GB); Darryl Smith, Singapore (SG)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 393 days.

This patent is subject to a terminal disclaimer.

(21) Appl. No.: 10/591,776

(22) PCT Filed: Feb. 28, 2005

(86) PCT No.: PCT/EP2005/002080
§ 371 (c)(1),
(2), (4) Date: Sep. 6, 2006

(87) PCT Pub. No.: WO2005/095291
PCT Pub. Date: Oct. 13, 2005

(65) Prior Publication Data
US 2007/0187330 A1    Aug. 16, 2007

(30) Foreign Application Priority Data
Mar. 12, 2004    (GB) ................. 0405493.8

(51) Int. Cl.
C02F 11/14 (2006.01)
(52) U.S. Cl. .............. 210/727; 210/728; 210/734; 210/738
(58) Field of Classification Search ........... 210/727
See application file for complete search history.

(56) References Cited

U.S. PATENT DOCUMENTS

| | | | | |
|---|---|---|---|---|
| 3,578,586 | A * | 5/1971 | Gal et al. ................. | 210/710 |
| 3,951,792 | A * | 4/1976 | Azorlosa et al. .......... | 210/728 |
| 4,105,558 | A | 8/1978 | Heinrich et al. .......... | 210/199 |
| 4,382,864 | A | 5/1983 | Hashimoto et al. ........ | 210/727 |
| 4,479,879 | A | 10/1984 | Hashimoto et al. ........ | 210/727 |
| 4,506,062 | A | 3/1985 | Flesher et al. ............ | 526/211 |
| 4,528,321 | A | 7/1985 | Allen et al. .............. | 524/761 |
| 4,599,379 | A | 7/1986 | Flesher et al. ............ | 524/801 |
| 4,705,640 | A | 11/1987 | Whittaker ................ | 210/733 |
| 4,720,346 | A | 1/1988 | Flesher et al. ............ | 210/734 |
| 4,835,206 | A * | 5/1989 | Farrar et al. .............. | 524/457 |
| 4,840,736 | A * | 6/1989 | Sander et al. ............. | 210/727 |
| 4,861,492 | A * | 8/1989 | Lehmkuhl et al. ......... | 210/709 |
| 5,112,500 | A * | 5/1992 | Jones ..................... | 210/728 |
| 5,178,774 | A * | 1/1993 | Payne et al. .............. | 210/727 |
| 5,213,693 | A | 5/1993 | McGrow et al. .......... | 210/728 |
| 5,370,800 | A * | 12/1994 | Stevenson ................ | 210/710 |
| 5,433,865 | A | 7/1995 | Laurent ................... | 210/727 |
| 5,681,480 | A | 10/1997 | Langley et al. ........... | 210/727 |
| 5,698,109 | A * | 12/1997 | Payne et al. .............. | 210/727 |
| 5,846,433 | A * | 12/1998 | Sorensen et al. .......... | 210/709 |
| 6,001,920 | A | 12/1999 | Ghafoor et al. ........... | 524/500 |
| 6,031,037 | A | 2/2000 | Ghafoor et al. ........... | 524/388 |
| 6,063,291 | A * | 5/2000 | Allen et al. .............. | 210/727 |
| 6,117,938 | A * | 9/2000 | Farinato et al. ........... | 524/801 |
| 6,447,687 | B1 * | 9/2002 | Winn et al. ............... | 210/709 |
| 6,485,651 | B1 | 11/2002 | Branning ................. | 210/702 |
| 6,805,803 | B1 | 10/2004 | Weier et al. .............. | 210/728 |
| 7,070,696 | B2 * | 7/2006 | Weir et al. ............... | 210/727 |
| 7,252,783 | B2 | 8/2007 | Weir et al. | |
| 2003/0178371 | A1 | 9/2003 | Norman et al. ........... | 210/723 |
| 2004/0035800 | A1 | 2/2004 | Weir ...................... | 210/723 |
| 2004/0136889 | A1 | 7/2004 | Bonath et al. ............. | 423/80 |
| 2006/0016761 | A1 | 1/2006 | Mohammed et al. ...... | 210/728 |

FOREIGN PATENT DOCUMENTS

| | | |
|---|---|---|
| EP | 0 102 760 | 3/1984 |
| EP | 0 126 528 | 11/1984 |
| EP | 0 150 933 | 8/1985 |
| EP | 0 202 780 | 11/1986 |
| EP | 0 479 616 | 4/1992 |
| EP | 1 035 077 | 9/2000 |
| JP | 61-257300 | 11/1986 |
| JP | 6-343999 | 12/1994 |
| JP | 6-344000 | 12/1994 |
| JP | 10-249398 | 9/1998 |
| WO | 98/31748 | 7/1998 |

(Continued)

OTHER PUBLICATIONS

English Language abstract of EP 1 035 077 from the esp@cenet web site printed Oct. 31, 2006.

(Continued)

Primary Examiner—Peter A Hruskoci
(74) Attorney, Agent, or Firm—Shiela A. Loggins

(57) ABSTRACT

A process of dewatering an aqueous suspension comprising dosing the suspension with a flocculating amount of a first flocculant to form a thickened suspension and mixing into the thickened suspension a dewatering amount of a second flocculant and subjecting the thickened suspension to mechanical dewatering to form a cake, characterised in that the second flocculant comprises a water-soluble or water swellable polymer that is mixed into the suspension in the form of (i) substantially dry polymer particles or (ii) an aqueous composition comprising dissolved or hydrated polymer having a polymer concentration of at least 2% by weight and having a intrinsic viscosity of at least 3 dl/g.

9 Claims, No Drawings

FOREIGN PATENT DOCUMENTS

| | | |
|---|---|---|
| WO | 98/31749 | 7/1998 |
| WO | 01/05712 | 1/2001 |
| WO | 02/072482 | 9/2002 |
| WO | 02/079099 | 10/2002 |
| WO | 02/083258 A2 | 10/2002 |
| WO | 2004/022493 | 3/2004 |

OTHER PUBLICATIONS

Derwent abstract No. 1998-561468 for Japanese Patent 10-249398 Oct. 24, 2006.

Derwent abstract No. 1986-343211 for Japanese Patent 61-257300 (2006).

Derwent abstract No. 1995-069521[10] for Japanese Patent 6-343999 (2006).

Derwent abstract No. 1995-069522[10] for Japanese Patent 6-344000 (2006).

* cited by examiner

DEWATERING PROCESS

The present invention concerns the flocculation and dewatering of aqueous suspensions to form a dewatered cake.

It is well known to apply flocculants to aqueous suspensions in order to separate solids from the suspension. For instance it is common practice to flocculate and then dewater suspensions containing either suspended solid, organic material or mineral solids. For instance it is common practice to flocculate sludges such as sewage sludge, waste waters, textile industry effluents, red mud from the Bayer Alumina process and suspensions of coal tailings etc. Flocculation is usually achieved by mixing into the suspension the flocculant, allowing the suspended particles to flocculate and then dewatering the flocculated suspension to form a dewatered cake.

In the dewatering of suspensions it is known to add a high molecular weight, water soluble polymer as a flocculant to the suspension in order to remove the liquid from the suspension and greatly increase the dry solids of the suspension. High molecular weight flocculants may be cationic, anionic, non-ionic or amphoteric in nature. The choice of polymeric flocculent will largely depend upon the susbstrate which is being treated. For instance it is common practice to use high molecular weight cationic flocculants to treat aqueous suspensions comprising suspended organic material, for instance sewage sludge. In paper-making it is known to use either cationic, nonionic, anionic or amphoteric flocculants. Flocculation of mineral suspensions is frequently effected by use of anionic flocculants.

It is standard practice to apply polymers as aqueous compositions to flocculate suspensions containing suspended organic material. Generally the compositions of polymers are relatively dilute, for instance no more than 1% and usually no more than 0.5%, and can be as low as 0.2% by weight or lower.

Various alternative methods of introducing a flocculant into a suspension have been proposed. WO-A-02/079099 describes a method in which at least one flocculant emulsion is added directly to a solids liquid separation process and inverted in situ such that flocculent is released directly into the application. The emulsion is added specifically at the solids liquid separation process and subjected to an effective amount of high shear for sufficient time and pressure to ensure rapid inversion of the emulsion and complete release of the flocculant into the bulk suspension before any initial separation.

WO-A-98/31749 and WO-A-98/31748 are both concerned with preparing dispersions of high intrinsic viscosity cationic polymers in an aqueous and medium containing dissolved low intrinsic viscosity cationic polymer. The product thus formed is an aqueous dispersion of undissolved high intrinsic viscosity cationic polymer, which is a convenient way of providing high molecular weight flocculants. The dispersion polymer can be dissolved in water to a conventional concentration or can be added directly to a suspension.

It is also known to use two different polymeric flocculants in the same process. In commercial practice the dewatering of sewage sludge may involve the addition of two polymeric flocculants which have the same charge (co-ionic). In other processes it is known to apply two polymers of opposite charge (counter-ionic). Where two polymeric flocculants are applied to an aqueous suspension they may be added simultaneously or more usually sequentially.

U.S. Pat. No. 4,861,492 describes thickening a sludge by treatment with a polymer solution followed by a further treatment with the polymer solution before pressure dewatering. The polymer solution is said to be at a conventional concentration of between 0.2 and 1.5 percent and would be at the same concentration in both treatments.

WO-A-01/05712 reveals a process of dewatering a suspension by adding to the suspension a concentrated and a dilute solution of polymeric flocculants substantially simultaneously. Both the concentrated and diluted solutions of polymer are added at conventional concentrations of no more than 1% and usually much less than this.

WO-A-02/72482 describes a process of flocculating and dewatering an aqueous suspension of suspended solids in which a polymer composition comprising 40% and 60% by weight polymer and a polymer composition comprising between 0.05 and 0.2% by weight polymer are introduced simultaneously. Although the process brings about some improvements in filtration and free drainage, it would be desirable to improve upon the cake solids obtained in dewatering suspensions, especially for sewage sludges.

International application PCT/EP03/09381, unpublished at the priority date of of the present application, describes a method of dewatering a suspension employing a composition comprising a cationic polymer flocculant and a coagulant in which the coagulant is encapsulated. After free drainage of the suspension the coagulant is released into the suspension for example by rupturing of the capsules that enclose the coagulant or by migration from a matrix in which the coagulant is entrapped. Although significant improvements in cake solids can be obtained it would be desirable to provide equivalent or improved cake solids using flocculant products that can be more easily manufactured and/or applied.

However, achieving high cake solids can sometimes be difficult, particularly in the dewatering of sewage sludges. It is also known to add a flocculant or coagulant to assist the initial dewatering of a suspension followed by further addition of flocculant or coagulant and then further dewatering to achieve high cake solids. Such processes are described in JP-A-10-249398, JP-A-61-257300, JP-A-06-343999, JP-A-06-344000 and EP-A-1035077.

JP10249398 describes a two-stage dewatering process in which a polyamidine-base high molecular flocculant is used as either the first or second high molecular flocculants in the two-stage dehydration method. The polyamidine-base high molecular flocculent is obtained by copolymerizing (meth) acrylonitrile or N-vinylcarboxylic acid amide, N-isopropenylcarboxylic acid amide, N-vinylcarboxylic acid imide or N-isopropenylcarboxylic acid imide and hydrolyzing the copolymer to the amidine.

JP61257300 is concerned with reducing water content in dehydrated sludge cakes. Sewage sludge is dehydrated in a dehydrator after adding an organic high molecular flocculant to the sludge and then dehydrated further in the dehydrator by adding an inorganic treatment agent such as ferric chloride and then separating liquid from the sludge to form the cake. A solid or semi-solid cake is said to be obtained by adding the organic high molecular flocculant to the sludge and residual water is removed by adding the inorganic treatment agent.

JP06343999 describes a pre-treatment process for supplying sludge to a belt press type dehydrator. A high molecular weight cationic polymeric coagulant is added to the sludge to bring about flocculation which then provides a bulky flock structure. This is concentrated by a gravity dehydrator. A high cationicity polymeric coagulant is then added to this concentrated sludge which is then dewatered by belt press.

JP06344000 describes a process for mechanically dewatering sludge. A high molecular weight cationic polymeric coagulant is added to the sludge to bring about flocculation which then provides a bulky flock structure. This is then concentrated by a gravity dehydrator. A high cationicity polymeric coagulant is then added to this concentrated sludge which is then dewatered in a mechanical dehydrator.

EP-A-1035077 describes a process and assembly to dewater sludge, the sludge is fed to a mixing zone and treated with a flocculant. The flocculated sludge is removed from the mixing zone, subjected to preliminary dewatering and then subjected to a second flocculating process in a second mixing zone. The resulting thickened sludge is dewatered within a pressurized assembly to provide dewatered sludge and clear water is discharged from the secondary mixing zone prior to entry into the pressurise zone.

It would be desirable to provide an improved process that results in dewatering of suspensions to provide increased cake solids. In particular it would be desirable to provide such a process that involves treatment agents that can be easily and conveniently manufactured and applied.

According to the present invention we provide a process of dewatering an aqueous suspension comprising dosing the suspension with a flocculating amount of a first flocculant to form a thickened suspension and mixing into the thickened suspension a dewatering amount of a second flocculent and subjecting the thickened suspension to mechanical dewatering to form a cake, characterised in that the second flocculant comprises a water-soluble or water swellable polymer which is added to the suspension in the form of (i) substantially dry polymer particles or (ii) an aqueous composition comprising dissolved or hydrated polymer having a polymer concentration of at least 2% by weight and an IV at least 3 dl/g.

The invention is applicable to any suitable suspensions in which it is desirable to concentrate suspended solids. This includes waste waters, textile industry effluents, mineral suspensions such as red mud from the Bayer Alumina process or coal tailings, paper mill wastes such as cellulosic sludges. The process is particularly applicable to the dewatering of sewage sludge.

In the dewatering process the suspension is first thickened following the addition of a first floccuIent. This stage involves the initial flocculation and release of free water to produce the thickened suspension. Generally the release of free water may be achieved by free drainage or filtration and it is common to employ mechanical means such as a belt thickener or rotary drum thickener. Typically addition of the first flocculant would be into the initial bulk suspension. The flocculant should be added in sufficient quantity to bring about initial flocculation and partial dewatering of the suspension. Preferably the suspension is thickened to produce a semi solid sludge paste. In general this first flocculant will be a polymer added in a conventional manner and at a conventional concentration, for instance 0.1% to 1% by weight, especially 0.2% to 0.5%.

The dewatering process requires mixing a second flocculant into this thickened suspension in which the second flocculant is either in the form of dry polymer particles or an aqueous composition of dissolved or hydrated polymer having a polymer concentration of at least 2% by weight. The dry particulate or high concentration aqueous second flocculant can be easily mixed into the thickened suspension and distributed throughout using conventional mixing equipment. Suitable mixing equipment includes, for instance, ribbon type mixers or kneading mixers. Ribbon type mixers consist of helical or spiral mixing blades that sweep across nearly the entire surface of the mixing vessel. Kneading mixers consist of two kneading arms that Intermesh as well as form a close tolerance to the mixer wall.

The thickened sludge is then subjected to mechanical dewatering which will release more water to produce a dewatered cake. Typically, this mechanical dewatering will normally involve compression and can for instance be any of belt press, filter press, screw press or centrifuge. When this treated thickened suspension is subjected to mechanical dewatering unexpectedly high cake solids can be achieved.

In one form of the invention the second flocculant is introduced into the thickened suspension in the form of dry polymeric particles. The polymeric particles may have a particle diameter as high as 2000 or 3000 microns or higher or can be as low as 10 or 20 microns or lower, although usually will not be below 50 microns. Generally the particle diameter will be in the range of 50 microns to 2000 microns. Preferably, the particles will have a diameter between above 100 and 800 microns, for instance 120 or 150 to 800 microns. More preferably the particles will range between 250 and 750 microns. The particles may also be defined by weight average particle diameter generally this will be between 50 and 1000 microns, preferably 100 to 800 microns and more preferably between 300 and 700 microns.

In a further embodiment the second flocculant may be introduced in the suspension in the form of a slurry of second flocculant polymer particles in a liquid. The liquid may be a suitable liquid and that does not adversely interact with either the particles of the second flocculant or the suspension. Suitably the liquid can be a polyethyleneglycol.

The second flocculant may also be introduced into the thickened suspension as an aqueous composition comprising either dissolved and/or hydrated polymer. The aqueous composition will comprise at least 2% by weight polymer. The aqueous composition may comprise as much as 10% or more polymer but generally useful results are obtained when the polymer concentration is between 2% and 5% by weight.

The first and second flocculants may be any suitable natural or synthetic polymeric flocculant and typically will be high molecular weight. Natural polymers include for instance cationic starch, anionic starch and chitosan etc. Synthetic polymers include linear, branched and cross-linked polymers of ethylenically unsaturated monomers. The first flocculant may be the same as the second flocculant or alternatively the two flocculants may be different. Usually the polymer of the first flocculant and second flocculant will be of molecular weight in excess of 500,000, usually at least one million and normally 5 million up to 30 million.

The first and second flocculants of the present invention may be cationic, anionic, nonionic or amphoteric in nature. The choice of polymeric flocculant will largely depend upon the substrate. For instance it is common practice to use high molecular weight cationic flocculants to treat aqueous suspensions comprising suspended organic material, for instance sewage sludge. In treating paper-mill waste it is known to use any of cationic, nonionic, anionic or amphoteric flocculants. Flocculation of mineral suspensions is frequently effected by use of anionic flocculants.

The polymer may be prepared by polymerisation of a water soluble monomer or water soluble monomer blend. By water soluble we mean that the water soluble monomer or water soluble monomer blend has a solubility in water of at least 5 g in 100 ml of water. The polymer may be prepared conveniently by any suitable polymerisation process.

When the water soluble polymer is nonionic the polymer may be formed from one or more water soluble ethylenically unsaturated nonionic monomers, for instance acrylamide, methacrylamide, hydroxyethyl acrylate, N-vinylpyrrolidone. Preferably the polymer is formed from acrylamide.

When the water soluble polymer is anionic the polymer is formed from one or more ethylenically unsaturated anionic monomers or a blend of one or more anionic monomers with one or more of the nonionic monomers referred to previously. The anionic monomers are for instance acrylic acid, methacrylic acid, maleic acid, crotonic acid, itaconic acid, vinylsulphonic acid, allyl sulphonic acid, 2-acrylamido-2-methylpropane sulphonic acid and salts thereof. A preferred polymer is the copolymer of sodium acrylate with acrylamide.

Preferably the water soluble polymer is cationic and is formed from one or more ethylenically unsaturated cationic monomers optionally with one or more of the nonionic monomers referred to herein. The cationic polymer may also be amphoteric provided that there are predominantly more cationic groups than anionic groups. The cationic monomers include dialkylamino alkyl (meth) acrylates, dialkylamino alkyl (meth) acrylamides, including acid addition and quaternary ammonium salts thereof, diallyl dimethyl ammonium chloride. Preferred cationic monomers include the methyl chloride quaternary ammonium salts of dimethylamino ethyl acrylate and dimethyl aminoethyl methacrylate. A particularly preferred polymer includes the copolymer of acrylamide with the methyl chloride quaternary ammonium salts of dimethylamino ethyl acrylate.

The polymers may be linear in that they have been prepared substantially in the absence of branching or cross-linking agent. Alternatively the polymers can be branched or cross-linked, for example as in EP-A-202780.

Desirably the polymer may be prepared by reverse phase emulsion polymerisation, optionally followed by dehydration under reduced pressure and temperature and often referred to as azeotropic dehydration to form a dispersion of polymer particles in oil. Alternatively the polymer may be provided in the form of beads by reverse phase suspension polymerisation, or as a powder by aqueous solution polymerisation followed by comminution, drying and then grinding. The polymers may be produced as beads by suspension polymerisation or as a water-in-oil emulsion or dispersion by water-in-oil emulsion polymerisation, for example according to a process defined by EP-A-150933, EP-A-102760 or EP-A-126528.

It is particularly preferred that the second flocculant is formed from at least 30% by weight cationic monomer or monomers. Even more preferred are polymers comprising at least 40 or 50% by weight cationic monomer units. It may be desirable to employ cationic polymers having very high cationicities, for instance up to 80 or even 100% cationic monomer units. It is especially preferred when the cationic second flocculant polymer is selected from the group consisting of cationic polyacrylamides, polymers of dialkyl diallyl ammonium chloride, dialkyl amino alkyl (meth)-acrylates (or salts thereof) and dialkyl amino alkyl (meth)-acrylamides (or salts thereof).

As stated previously the second flocculant is desirably of relatively high molecular weight. Normally the second flocculant is particulate and it will be a polymer that exhibits an intrinsic viscosity of at least 0.5 dl/g. Typically the intrinsic viscosity will be at least 3 dl/g, and often it can be as high as 20 or 30 dl/g but preferably will be between 4 and 10 dl/g. When introduced as an aqueous composition the second flocculant will be at least 3 dl/g, and can also be as high as 20 or 30 dl/g and also preferably will be between 4 and 10 dl/g.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per litre of deionised water) and the whole is diluted to the 100 ml mark with deionised water. The intrinsic viscosity of the polymers are measured using a Number 1 suspended level viscometer at 25° C. in 1M buffered salt solution.

One particularly useful cationic polymer type for use as second flocculant includes 50 to 100% by weight methyl chloride quaternary ammonium salt of dimethyl amino ethyl (meth) acrylate and 0 to 50% by weight acrylamide of intrinsic viscosity between 4 and 10 dl/g. Preferably the cationic polymer comprises at least 80% methyl chloride quaternary ammonium salt of dimethyl amino ethyl (meth) acrylate.

Other suitable polymeric second flocculants include polyvinyl amidine and polyvinyl amines of intrinsic viscosity greater than 1 dl/g, preferably greater than 2 dl/g.

Another particularly suitable category of second flocculants are Mannich addition polyacrylamides. Ideally such polymers will exhibit an intrinsic viscosity greater than 1 dl/g and quite often can be at least 4 dl/g, for instance at least 7 or 8 dl/g. Such polymers may be made by reacting formaldehyde/amine adducts with polyacrylamide. The amine may for instance be dimethylamine or other secondary amines. Preferably the Mannich addition polyacrylamides are quaternised salts and these could be prepared by reacting the free base Mannich with a suitable quaternising agent such as methyl chloride or dimethyl sulfate.

A further suitable polymer as the second flocculant includes poly dimethyl diallyl ammonium chloride of intrinsic viscosity greater than 0.5 dl/g, preferably at least 1 dl/g.

Effective dewatering can be obtained when these polymers are added as a second flocculant to the thickened suspension.

The dose of aqueous composition depends on the substrate and usually this will be a conventional amount. Typically for sewage sludge treatment the dose of the aqueous composition (second flocculant) found to be an effective dewatering amount is often at least 50 mg active polymer per litre of suspension. Usually the amount would be higher for instance up to 400 mg per litre. Preferred doses are between 60 and 300 mg per litre. The quantity of first flocculant used will usually be at least 50 mg active polymer per litre of suspension and can be as high as 500 or 600 mg per litre. Preferred doses would be between 100 and 400 mg per litre.

Various polymers may be used as the first flocculant in order to obtain a suitably thickened suspension for treatment with the second flocculant. Preferably the first flocculant is a cationic organic polymer. This is particularly true when the suspension is a sewage sludge. Preferred cationic polymers include polymers selected from the group consisting of acrylamide polymers, polyvinyl amidine, polyvinyl amine, poly dimethyl diallyl ammonium chloride, poly amines, polyethyleneimines, Mannich polyacrylamides and quaternised mannich polyacrylamides.

The following examples illustrates the invention.

EXAMPLE 1

Dewatering of Aqueous Suspensions Using a Two-Stage Addition of Organic Polymer Flocculant Polymers Polymer A is a linear, high molecular weight, cationic acrylamide based polymer of intrinsic viscosity 12 dl/g in dehydrated emulsion (liquid dispersion product) form. Polymer B is a linear, cationic quaternised dimethyl amino ethyl methacrylate based homopolymer in bead form of intrinsic viscosity 5 dl/g.

Unless otherwise stated intrinsic viscosity is measured using a Number 1 suspended level viscometer, in 1M sodium chloride buffered to pH 7 in accordance with the information given in the description.

Test Substrate

Dewatering tests were conducted on a sample of a digested, mixed primary/activated sludge. The sample had a dry solids content of 3.28%.

Experimental Procedure (A) Two-Stage Addition of Polymer i) Polymer A was first dissolved in deionised water to give a homogeneous 1% w/v solution and further diluted to 0.25% w/v prior to use. Polymer B was dissolved in deionised water to give three homogeneous solutions of 1% w/v, 5% w/v and 20% w/v. The 1% w/v solution was further diluted with deionised water to 0.25% w/v prior to use.

ii) 250 ml of a digested mixed primary/activated sludge was placed in a 1 litre plastic beaker (120 cm diameter by 120 cm tall). A standard laboratory stirrer was secured over the beaker with the stirrer shaft located through a hole in the centre of the beaker lid. The stirrer is a four bladed, flat crosshead type (each paddle is 25 cm width by 1.1 cm).

iii) the appropriate volume of a 0.25% solution of Polymer A was added to the sludge using a syringe and the lid secured to the beaker. The sludge was flocculated by stirring at 1500 rpm for 10 s. The flocculated sludge was poured into a filtration cell, which had a filter membrane comprising an 8 cm diameter belt-press filter cloth, and the filtrate collected in a measuring cylinder.

iv) after 30 s drainage the thickened sludge retained on the filter cloth was subjected to a 'furrowing' technique, whereby a spatula was slowly drawn across the sludge in several directions to encourage release of more water. Furrowing was carried out for 30 s. The volume of filtrate was noted.

v) the thickened sludge was transferred to a 250 ml beaker. Polymer B was then added into the thickened sludge. Polymer B solutions, ie 0.25%, 5% and 20% w/v, were applied using a syringe, whilst dry Polymer B was simply sprinkled onto the top of the thickened sludge. To mix in the polymer the treated thickened sludge was stirred by hand for 45 s with a spatula, using a slow, circular folding action.

vi) the polymer treated thickened sludge was then transferred to a piston-press apparatus and subjected to a compression dewatering stage. Dewatering was commenced using a pressure of 20 psi for 2 minutes, followed by increases of 10 psi at one minute intervals for a further 3 minutes to a maximum of 60 psi. Pressure was maintained at 60 psi for a further 5 minutes, giving a total compression dewatering time of 10 minutes. Cake solids content was determined by heating at 110° C. overnight.

(B) Control—Conventional First-Stage Addition of Dilute Polymer(s), Including Mixing of the Thickened Sludge.

The procedure was exactly the same as that described in Section (A) except:

In sub-section iii) the appropriate volume of a 0.25% w/v solution of polymer B was added simultaneously with the 0.25% solution of Polymer A.

In sub section v) the addition of polymer B was omitted; nevertheless the thickened sludge was stirred by hand for 45 s with a spatula, using a slow, circular folding action.

(C) Control—Conventional First-Stage Addition of Dilute Polymer(s) Excluding Mixing of the Thickened Sludge.

The procedure was exactly the same as that described in Section (A) except:

In section iii) the appropriate volume of a 0.25% w/v solution of polymer B was added simultaneously with the 0.25% solution of Polymer A.

Section v) was omitted

Results

The results of test (A) are given in Table 1

The results of tests (B) and (C) are given in Table 2

TABLE 1 results of two-stage addition of polymer

| Polymer A Dose (mg/l) | Filtrate Volume (ml) | Polymer B Dose (mg/l) | Polymer B Solution strength (w/v) | Cake solids (%) |
|---|---|---|---|---|
| 200 | — | 75 | 0.25% | 20.40 |
| 200 | 168 | 100 | 0.25% | 20.86 |
| 200 | — | 150 | 0.25% | 21.88 |
| 200 | 164 | 75 | 5.0% | 19.62 |
| 200 | — | 100 | 5.0% | 20.72 |
| 200 | — | 150 | 5.0% | 22.27 |
| 200 | 170 | 75 | 20% | 18.52 |
| 200 | — | 100 | 20% | 19.72 |
| 200 | — | 150 | 20% | 21.77 |
| 200 | 168 | 75 | Dry product < 500μ | 18.65 |
| 200 | — | 100 | Dry product < 500μ | 20.30 |
| 200 | — | 150 | Dry product < 500μ | 22.21 |

TABLE 2 results of first stage addition of conventional dilute solutions

| Polymer A Dose (mg/l) | Filtrate Volume (ml) | Polymer B Dose (mg/l) | Polymer B Solution strength (w/v) | Cake solids (%) |
|---|---|---|---|---|
| 200 | 170 | 75 | 0.25% | 14.60 |
| 200 | 174 | 100 | 0.25% | 15.15 |
| 200 | 180 | 150 | 0.25% | 15.81 |
| 200 | — | 75 | 0.25% | 15.78* |
| 200 | 176 | 100 | 0.25% | 16.39* |
| 200 | 178 | 150 | 0.25% | 17.27* |

*Omission of second stage mixing of thickened sludge

The results in Tables 1 and 2 demonstrate that drier cake solids are produced using a two-stage addition of polymer.

The results in Table 1 show that high strength polymer solution (5% and 20%) and substantially dry polymer, are as effective as conventional polymer solution strength (0.25%) in giving drier cake solids.

The results in Table 2 also show that, with conventional treatment, additional mixing of the thickened sludge (Set 1) has an adverse effect on cake solids compared to no additional mixing (Set 2).

EXAMPLE 2

To Demonstrate that Cake Solids are Not Improved When a Second Flocculant is Added at High Concentration or as a Solid Simultaneously with the First Flocculant Polymers Polymer A is a linear, high molecular weight, cationic acrylamide based polymer of intrinsic viscosity 12 dl/g in dehydrated emulsion (liquid dispersion product) form. Polymer B is a linear, cationic quaternised dimethyl amino ethyl methacrylate based homopolymer in bead form of intrinsic viscosity 5 dl/g.

Unless otherwise stated intrinsic viscosity is measured using a Number 1 suspended level viscometer, in 1M sodium chloride buffered to pH 7 in accordance with the information given in the description.

Test Substrate

Dewatering tests were conducted on a sample of a digested, mixed primary/activated sludge. The sample had a dry solids content of 2.16%.

Experimental Procedure (A) Two-Stage Addition of Polymer
i) Polymer A was first dissolved in deionised water to give a homogeneous 1% w/v solution and further diluted to 0.25% w/v prior to use. Polymer B was dissolved in deionised water to give three homogeneous solutions of 1% w/v, 5% w/v and 20% w/v. The 1% w/v solution was further diluted with deionised water to 0.25% w/v prior to use.
ii) 250 ml of a digested mixed primary/activated sludge (ex Rotherham STW) was placed in a 1 litre plastic beaker (120 cm diameter by 120 cm tall). A standard laboratory stirrer was secured over the beaker with the stirrer shaft located through a hole in the centre of the beaker lid. The stirrer is a four bladed, flat crosshead type (each paddle is 25 cm width by 1.1 cm).
iii) the appropriate volume of a 0.25% solution of Polymer A was added to the sludge using a syringe and the lid secured to the beaker. The sludge was flocculated by stirring at 1500 rpm for 10 s. The flocculated sludge was poured into a filtration cell comprising an 8 cm diameter belt-press filter cloth and the filtrate collected in a measuring cylinder.
iv) after 30 s drainage the thickened sludge retained on the filter cloth was subjected to a 'furrowing' technique, whereby a spatula was slowly drawn across the sludge in several directions to encourage release of more water. Furrowing was carried out for 30 s. The volume of filtrate was noted.
v) the thickened sludge was transferred to a 250 ml beaker. Polymer B was then added into the thickened sludge. Polymer B solutions, ie 0.25%, 5% and 20% w/v, were applied using a syringe, whilst dry Polymer B was simply sprinkled onto the top of the thickened sludge. To mix in the polymer the treated thickened sludge was stirred by hand for 45 s with a trulla, using a slow, circular folding action.
vi) the polymer treated thickened sludge was then transferred to a piston-press apparatus and subjected to a compression dewatering stage. Dewatering was commenced using a pressure of 20 psi for 2 minutes, followed by increases of 10 psi/min for a further 3 minutes to a maximum of 60 psi. Pressure was maintained at 60 psi for a further 5 minutes, giving a total compression dewatering time of 10 minutes. Cake solids content was determined by heating at 110 C overnight.

(B) Control—Conventional First-Stage Addition of Dilute Polymer(s) Excluding Mixing of the Thickened Sludge.
The procedure was exactly the same as that described in Section (A) except:
In section iii) the appropriate volume of a solution of Polymer B, or dry Polymer B, was added simultaneously with the 0.25% solution of Polymer A.
Section v) was omitted Results
The results of test (A) are given in Table 1
The results of test (B) are given in Table 2

TABLE 1 results of two-stage addition of polymer

| | | Polymer B | | |
|---|---|---|---|---|
| Polymer A Dose (mg/l) | Filtrate Volume (ml) | Dose (mg/l) | Solution strength (w/v) | Cake solids (%) |
| 150 | 190 | 75 | 5.0% | 25.72 |
| 150 | — | 100 | 5.0% | 26.55 |
| 150 | — | 150 | 5.0% | 25.55 |

TABLE 2 results of simultaneous addition of Polymer A and Polymer B

| Polymer A Dose (mg/l) | Filtrate Volume (ml) | Polymer B | | Cake solids (%) |
|---|---|---|---|---|
| | | Dose (mg/l) | Solution strength (w/v) | |
| 150 | 196 | 75 | 0.25% | 19.49 |
| 150 | 194 | 100 | 0.25% | 20.29 |
| 150 | 196 | 150 | 0.25% | 20.40 |
| 150 | 190 | 75 | 5.0% | 19.50 |
| 150 | 190 | 100 | 5.0% | 19.80 |
| 150 | 190 | 150 | 5.0% | 20.85 |
| 150 | 192 | 75 | 20% | 18.75 |
| 150 | 190 | 100 | 20% | 18.93 |
| 150 | 190 | 150 | 20% | 19.88 |
| 150 | 194 | 75 | Dry product < 500□ | 19.17 |
| 150 | 190 | 100 | Dry product < 500□ | 19.04 |
| 150 | 190 | 150 | Dry product < 500□ | 19.94 |

The results in Tables 1 and 2 demonstrate that drier cake solids are produced using two-stage addition of polymer as opposed to simultaneous addition.

The results in Table 2 also show that simultaneous addition of Polymer B, using either a high strength solution (5% or 20%) or as dry polymer, does not give an improved result compared to simultaneous addition using conventional concentration (0.25%).

The invention claimed is:
1. A process of dewatering an aqueous suspension in which the aqueous suspension is sewage sludge comprising
a) dosing the suspension with a flocculating amount of a first flocculant in which the first flocculant is cationic acrylamide organic polymer of a molecular weight of at least one million to form a thickened suspension,
b) adding and mixing into the thickened suspension formed in step a) a dewatering amount of a second flocculant in which the second flocculant is a water-soluble or water swellable polymer formed from 50 to 100% by weight methyl chloride quaternary ammonium salt of dimethy- lamino ethyl (meth)acrylate and 0 to 50% by weight acrylamide of intrinsic viscosity between 4 and 10 dl/g, wherein the second flocculant is distributed throughout the thickened suspension of part b) using mixing equipment, and c) subjecting the thickened suspension to mechanical compression dewatering to form a cake, characterised in that the second flocculant of step b) is mixed into the suspension in the form of (i) substantially dry polymer particles having a diameter of at least 50 microns or (ii) an aqueous composition comprising dissolved or hydrated polymer having a polymer concentration of at least 2% by weight.

2. A process according to claim 1 in which the mechanical compression dewatering employs an apparatus selected from the group consisting of belt press, filter press, screw press and centrifuge.

3. A process according to claim 1 in which the second flocculant is in the form of an aqueous composition comprising dissolved or hydrated polymer having a polymer concentration between 2 and 5% by weight.

4. A process according to claim 1 in which the second flocculant is formed from at least 80% by weight cationic monomer or monomers.

5. A process according to claim 1 in which the second flocculant is introduced into the suspension in form of a slurry in a liquid.

6. A process according to claim 5 in which the liquid is polyethylene glycol.

7. A process according to claim 1 in which the substantially dry particles have a diameter of 50 microns to 3000 microns.

8. A process according to claim 7 in which the substantially dry particles have a diameter from 50 and 1000 microns.

9. A process according to claim 1, in which the first flocculant molecular weight ranges from 5 million up to 30 million.

* * * * *